April 7, 1953   E. A. JUZWIAK   2,634,029
SPREADER WITH MEANS TO ADJUST THE DISCHARGE THEREFROM
Filed April 29, 1950   3 Sheets-Sheet 1
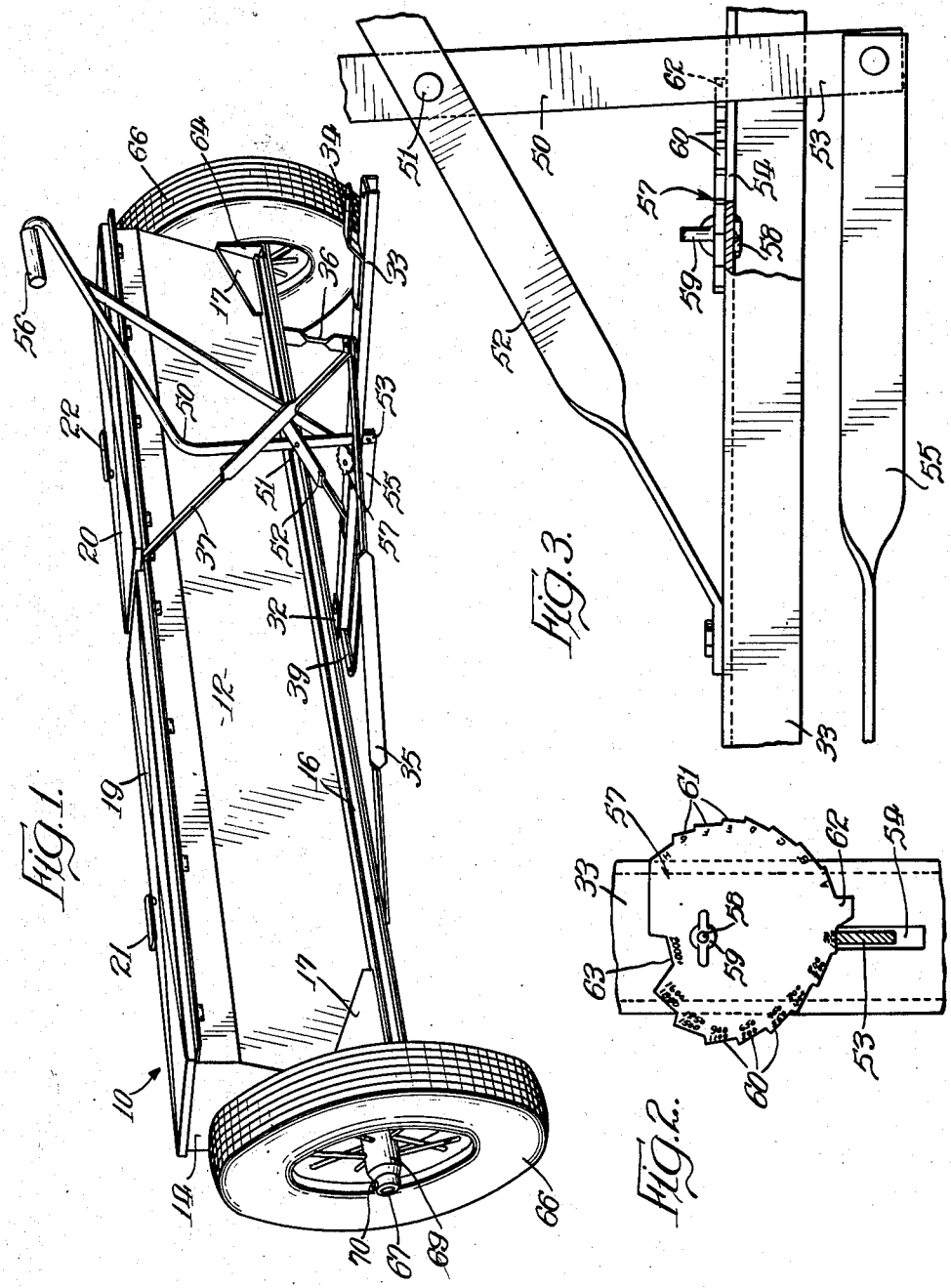
INVENTOR.
Edmond A. Juzwiak
BY
Kegan and Kegan
Attys.

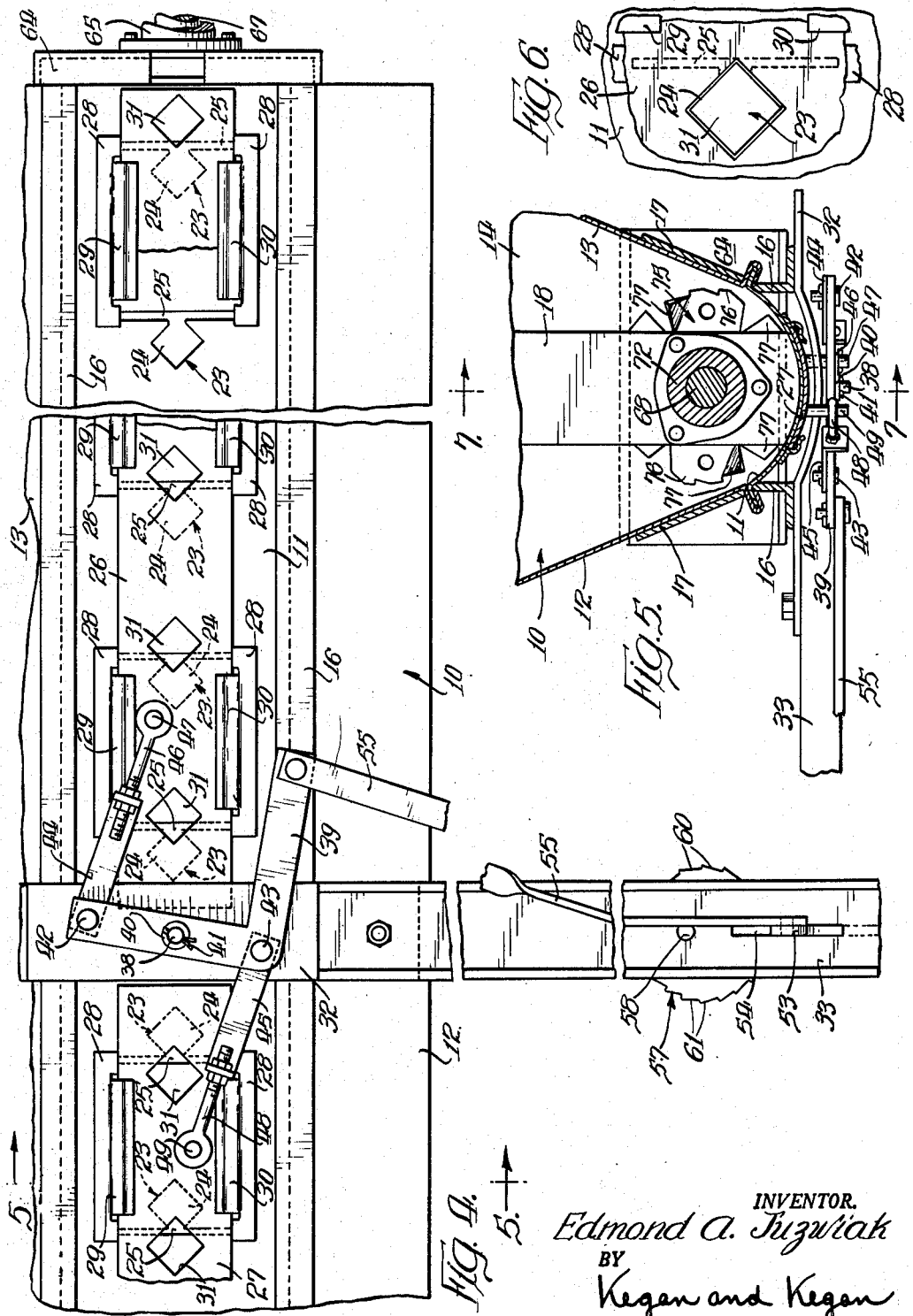

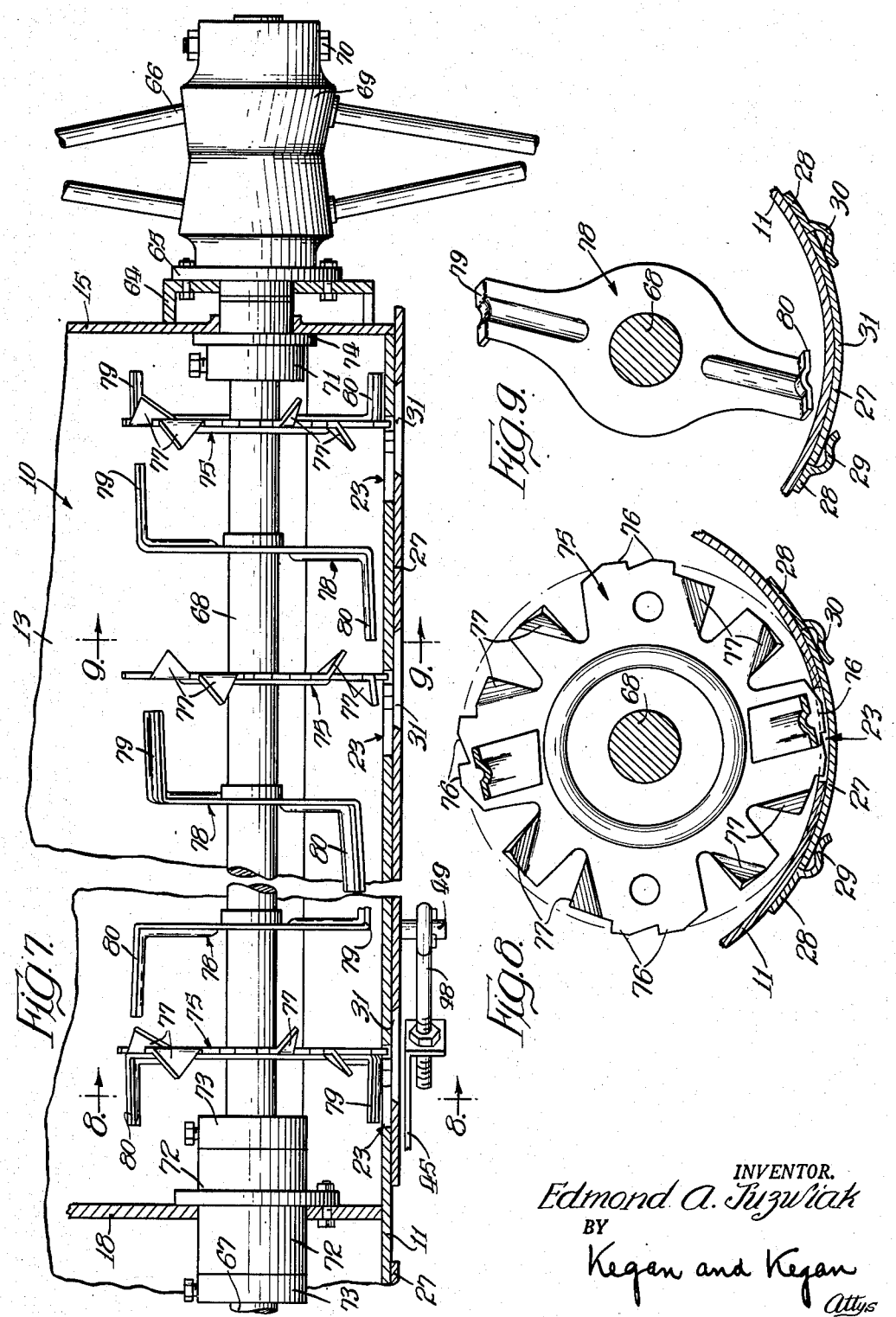

Patented Apr. 7, 1953

2,634,029

UNITED STATES PATENT OFFICE 2,634,029

SPREADER WITH MEANS TO ADJUST THE DISCHARGE THEREFROM

Edmond A. Juzwiak, Chicago, Ill., assignor to Ezee Flow Corporation, Chicago, Ill., a corporation of Illinois Application April 29, 1950, Serial No. 159,013

11 Claims. (Cl. 222—485)

My invention relates generally to material spreading apparatus of the type used to spread or sow lime, fertilizers, and other fluent solid chemicals; grains, grasses, legumes and like material. More particularly, my invention relates to improvements in the control mechanism for regulating the flow of material from said apparatus.

This application is a continuation-in-part of my co-pending case, filed April 28, 1949, Serial No. 90,086, now Patent No. 2,510,231, dated June 6, 1950, and entitled Spreader, which in turn is a continuation-in-part of my prior abandoned application filed June 6, 1947, Serial No. 752,935, also entitled Spreader.

The principal problem in dispensing materials of the type specified above, is to maintain a steady, even flow of the fluent solid material throughout the length of the spreader, even though the material which is being handled is highly cohesive (such as for example super phosphate fertilizer); wet, green or improperly cured fertilizers; damp and/or densely packed feeds or grains; or old fertilizer which has set up and become lumpy and hard. Another and related problem is that of dispensing such materials even at such small rates of discharge as 50 pounds per acre, so that highly concentrated fertilizers may be efficiently used.

In my divisional application, Serial No. 90,086, I disclosed in detail apparatus whereby a positive flow of material from the spreader is obtained, even under the most adverse conditions. In addition to this positive action feed mechanism, however, it is also important to provide mechanism for regulating the flow of material to within very close limits, otherwise the most efficient distribution of material commensurate with cost cannot be achieved. In addition, this control mechanism should provide for a wide range of rates of flow, for example from 50 pounds per acre to 2000 pounds per acre, so that different fertilizers and similar materials can be spread or sown using the same equipment. It will be apparent, however, that the factors of both adjustment and wide operating range conflict with each other, inasmuch as it is difficult to provide in a simple mechanism both versatility and a high degree of accuracy.

Heretofore, control mechanisms for material spreaders have generally taken the form of a lever which may be turned relative to a graduated, arcuate plate. Frequently these mechanisms rely solely on mechanical friction to hold them in the desired position. Or, occasionally, ratchet mechanisms are used to lock the operating lever in position. In either event, the operator must visually align the lever with whatever scale gradation provides the desired setting. This is undesirable for the reason that the operator must usually stop the tractor or other prime mover to set the operating lever to the proper position. Moreover, where the indicating or setting plate or scale is on the hopper, as is usually the case, the operator has difficulty in obtaining an accurate setting when seated on the tractor.

It is therefore a principal object of my invention to provide control mechanism for regulating the flow of material from a material spreader which is adjustable over a wide range of settings and accurate at each setting.

Another object of my invention is to provide control apparatus of the type specified which can be set to deliver a predetermined rate of flow each time a control lever is actuated, and which requires no visual alignment of the lever with a scale or the like.

Yet another object of my invention is to provide control apparatus for use with the feed mechanism disclosed in my divisional patent application Serial No. 90,086.

Another object is to provide control mechanism which is of simple, rugged construction and dependable in use.

To the end of achieving the aforesaid objects, my control mechanism for use with a material spreader including a shiftable shutter, comprises a stop member positioned on said material spreader to intercept and to limit the movement of an element of the control mechanism (such as the hand lever) in that direction which causes said shutter to open, the stop member having a stepped edge portion, means for shifting the stepped edge portion of the stop member relative to said element to bring different steps thereof into alignment with said element, whereby the range of movement of said element may be preset, and means for releasably locking said stop member in place. In a preferred embodiment, the stop member is in the form of a rotatable plate having a plurality of flat detent surfaces lying on radii of different lengths, and each substantially perpendicular to its respective radius.

My control mechanism for regulating the flow of material from a material spreader, is characterized by the following desirable features: (1) By presetting the stop member to align one of the steps or detent surfaces to intercept the control lever, the same effective discharge area is obtained each time the control lever is actuated from the closed position, without requiring any attention on the part of the operator, who may therefore focus his entire attention on the operation of the tractor or other prime mover. (2) There is no need for the operator to stop the tractor to set the control mechanism in the open position, since the control lever can be positioned so that the operator need only reach back to grasp it and to open the shutter. (3) In a preferred embodiment, the entire adjustment is achieved by merely rotating a small plate which is approximately five inches in diameter, yet which provides for adjusting the rate of flow from between 50 pounds to 2000 pounds of material per acre, while at the same time providing for a corresponding adjustment for different sizes of seeds, grains, and legumes.

In order that my invention may be more fully disclosed, reference is had to the accompanying drawings which illustrate one form of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 1 is a perspective view of a wheel supported material spreader incorporating the present invention;

Figure 2 is a fragmentary plan view, showing the flow regulator plate whereby the flow of material from the material spreader may be regulated;

Figure 3 is a fragmentary side view, with some parts thereof broken away, showing further details of the flow regulator plate and the manner in which it is mounted on the material spreader;

Figure 4 is a fragmentary bottom view illustrating the manner in which the effective discharge area through which the material is discharged, may be adjusted using my invention;

Figure 5 is a fragmentary side view taken in section on the line 5—5 of Figure 4;

Figure 6 is a fragmentary bottom view showing the shutter plate in the full open posiiton;

Figure 7 is a fragmentary front view taken in section on the line 7—7 of Figure 5;

Figure 8 is a fragmentary side view taken in section on the line 8—8 of Figure 7 and showing a portion of the material feeding mechanism; and Figure 9 is a side view in section on the line 9—9 of Figure 7, showing another portion of the material feeding mechanism.

Like reference characters designate like parts in the drawings and in the description thereof following hereafter.

Referring now to the drawings, and more particularly to Figures 1 and 5 thereof, a material spreader is shown as including a hopper designated generally by the numeral 10 and comprising a bottom plate 11, a front wall 12 and a rear wall 13 secured thereto, and end walls 14 and 15. Two angle irons 16, 16 extend lengthwise of the bottom plate 11 and on each side thereof, respectively, to provide transverse stiffening of the hopper 10. Additional stiffening is provided by the gussets 17 at each corner of the hopper 10. Internally, the hopper 10 is reinforced by a vertical center post 18, while a pair of cover lids 19 and 20 is hinged to the front wall 12, said lids 19 and 20 being secured in place by means of the handles 21 and 22.

As it best shown in Figures 4 and 7, the bottom plate 11 includes a plurality of discharge ports 23 each of which comprises a substantially diamond shaped discharge area 24 and a slot 25 or channel portion extending across one corner of the area 24 and at right angles to the longitudinal axis of the bottom plate 11. The apparatus further includes a pair of shutters 26 and 27 slidable along the bottom of the hopper 10 relative to the discharge ports 23. A plurality of guide members 28 are spaced along the bottom of the plate 11 and act to support and guide the shutters 26 and 27. Each of the guide members 28 is provided with a pair of spring tongues 29 and 30 the purpose of which is to hold the shutters 26 and 27 in abutment with the bottom plate 11, yet permit reciprocal sliding movement therealong.

Each of the shutters 26 and 27 includes a plurality of unmutilated diamond-shaped apertures 31 which are registrable with the discharge areas 24 of the discharge ports 23, upon sliding said shutters 26 and 27 relative to the bottom plate 11.

Referring now to Figures 1 and 4, a center bridging member 32 is secured to the lower legs of the angle irons 16, 16. Extending from the front portion of the bridging member 32 is a drawbar 33 provided with a tractor hitch 34 at the free end thereof. A pair of tie rods 35 and 36 interconnect the front angle iron 16 with the drawbar 33, while a third tie rod 37 is connected to the top of the front wall 12. A stud 38 projects downwardly from the bridging member 32, and acts as a pivot about which the bell crank 39 rotates, said bell crank being retained on the stud 38 by the washer 40 and the cotter pin 41. Two pivot pins 42 and 43 are carried by the bell crank 39 eccentric of the stud 38, and are pivotally connected to the links 44 and 45, respectively. An eye bolt 46 adjustably secured to the link 44 connects said link to the pin 47 on the shutter 26, while a corresponding eye bolt 48 is connected to the pin 49 on the shutter 27.

By turning the bell crank 39 in a clockwise direction, as viewed in Figure 4, it is apparent that the shutters 26 and 27 will each move away from the bridging member 32, and thereby reduce the effective discharge area defined by the discharge ports 23 and the apertures 31. Conversely, as the bell crank 39 is rotated in the counterclockwise direction, the shutters 26 and 27 will move inwardly toward the bridging member 32, and thereby increase the effective discharge area through which the material is dispensed (Figure 6).

The bell crank 39 may be conveniently rotated to give the desired setting of the shutters 26 and 27, through movement of the control lever 50 (Figures 1 and 3). Said control lever 50 is pivotally mounted on the pin 51 carried by the strut 52 secured between the drawbar 33 and the tie rod 37. The lower end portion 53 of the control lever 50 extends through the slot 54 in the drawbar 33 (Figures 2 and 3) and is drivably connected to the bell crank 39 through the connecting rod 55. When the handle 56 of the control lever 50 is pushed away from the hopper 10, the bell crank 39 turns in a clockwise direction as viewed in Figure 4. In this way the shutters 26 and 27 may be moved to cover completely the discharge ports 23. As further shown in Figure 1, the drawbar 33 is provided with a hitch 34 whereby the spreader may be connected to a tractor or other propelling means. Thus the handle 56 will be in close proximity to the driver of the pulling vehicle, so that said driver can quickly close the discharge ports by reaching back, grasping the handle 56 and pulling it toward him.

Referring now to Figures 2 and 3, a flow regulator plate 57 is secured to the drawbar 33 by the threaded pin 58 positioned to the rear of the slot 54, and the thumb screw nut 59. The plate 57 is provided with a first series of stop edges 60 which lie on progressively different radii with respect to the pivotal axis of the threaded pin 58. A second series of stop edges 61 is also formed in the regulator plate 57, as shown. As best shown in Figure 3, the lower end portion 53 of the control lever 50 cannot move along the slot 54 beyond the particular stop edge 60 or 61 intersecting the same. The operator can therefore adjust the degree of registration between the apertures 31 and the discharge ports 23 by positioning the regulator plate 57 so that the appropriate stop edge 60 or 61 is in alignment with the slot 54. In the example of Figure 2, the first series of stop edges 60 is marked to read in pounds of material discharged for each acre of ground covered, while the second series of stop edges 61 is marked in various degrees of openings commensurate with the proper sowing of grains, grasses, legumes, etc. When the projection 62 is aligned with the slot 54, the control lever 50 is locked against opening, so that the shutters 26 and 27 cannot inadvertently shift to open the discharge ports 23. On the other hand, the discharge ports 23 are fully opened when the notch 63 is aligned with the slot 54, and the lower end portion 53 of the control lever 50 moved thereagainst.

In addition to the aforesaid flow regulating mechanism, the hopper 10 includes a channel bracket 64 secured to each of the end walls 14 and 15. A sleeve 65 is secured to each of the channel brackets 64, while a rubber tired wheel 66 is rotatable about said sleeve 65. A pair of co-axial armature shafts 67 and 68 are rotatably supported at the outer ends thereof by the hollow sleeves 65, 65. The shafts 67 and 68 are drivably connected to the hubs 69, 69 of the wheels 66, 66 through the shear pins 70, 70. Secured to each of the shafts 67 and 68 adjacent the end walls 14 and 15, is a thrust collar 71 and a sealing collar 74. The inner ends of the shafts 67, 67 are rotatably supported by the bearing sleeves 72, 72 which are in turn secured to the center post 18, while in addition the inner ends of the shafts 67, 68 are each provided with a thrust collar 73. Thus as the spreader is drawn forward, the turning motion of the wheels 66 is transmitted through the shear pins 70 to the armature shafts 67 and 68.

Secured to the armature shafts 67 and 68, and spaced therealong in a manner conforming to the spacing between the slots 25 of the discharge ports 23, are a plurality of disk-shaped members 75 which provide means for making dynamic the discharge ports 23, in the manner described in my co-pending divisional patent application, Serial No. 90,086. As best shown in Figure 8, each of the members 75 is provided with a plurality of sets of stepped feeder teeth 76, which move through the slots 25. In addition, each of the members 75 is provided with a plurality of circumferentially spaced wings or charging vanes 77 projecting alternately in opposite directions from said member 75 and inclined so as to sweep material toward the path of the feeder teeth 76 as the armature shafts 67 and 68 rotate.

Referring now to Figures 7 and 9, a plurality of spiders 78 or agitator vanes are spaced on the shafts 67 and 68 intermediate the disk-shaped members 75. Each of the spiders 78 includes a pair of agitator arms 79 and 80 extending longitudinally on opposite sides thereof and approximately 180 degrees out of phase with each other. In addition, the two end members 75 on each of the shafts 67 and 68 are each provided with a pair of agitator arms 79 and 80, to make more complete the agitation and mixing of the material within the hopper 10.

To use the spreader shown in the drawings, the drawbar 33 is first hitched to the tractor or other propelling means, the hopper 10 is filled with material to be spread, and the flow regulator plate 57 set to the desired rate of discharge. As the spreader moves forward, the rotating wheels 66, 66 turn the shafts 67 and 68 and the members 75 and spiders 78 fastened thereto. These latter devices operate to efficiently agitate material within the hopper 10, and to alternately charge each of the discharge ports 23 with material and thereafter drive a portion of said material therethrough, the quantity of material discharged being a function of the position of the shutters 26 and 27 relative to the discharge ports 23. As shown above, the flow regulator plate 57, operating as a stop member limiting motion of the lower end portion 53 of the control lever 50, provides a means for moving the shutters 26 and 27 to the exact position each time the handle 56 is moved toward the hopper 10. Merely by reaching back and moving the handle 56, the operator can at his election, and without even looking at any scale or other indicating device, either open the shutters 26 and 27 to the desired position, or else completely close off the discharge ports 23 to stop all flow of material.

To reset the degree to which the discharge ports 23 are opened upon actuation of the control lever 50, the operator first closes the shutters 26 and 27, loosens the thumb screw nut 59 and repositions the flow regulator plate 57 until that stop edge 60 or 61 which provides the desired rate of flow, is aligned with the slot 54. The thumb screw nut 59 is then tightened down, to lock the plate 57 in place. By making the stop edges 60 and 61 substantially perpendicular to their respective radii, there is no appreciable eccentric load exerted on the plate 57, upon actuation of the control lever 50, tending to cause said plate 57 to rotate out of position. Thus the lock nut 59 can be small and light, as shown, thereby making the resetting operation almost as rapid and simple as the closing and opening operations.

Referring now to Fig. 2, it will be observed that the series of stop edges 60 is provided with a double scale, the one ranging from 50 pounds to 2000 pounds per acre, while the other ranges from 150 pounds to 2000 pounds per acre. Depending on his needs, the user can set the apparatus to operate at either one of these two sets of readings, by adjusting the closed position of the shutters 26 and 27 by means of the threaded eye bolts 46 and 49.

Having thus fully disclosed my novel flow regulator mechanism for material spreaders, and demonstrated its utility by reference to a specific embodiment, as used with a preferred type of material feeding mechanism, I claim as my invention:

1. In a material spreader, a hopper having at least one discharge port in the bottom thereof, at least one ported slidable shutter below and adjacent to said bottom, means on said hopper for supporting and guiding said shutter, a first lever pivotally connected to said hopper, means connecting said first lever to said shutter and adapted to translate oscillatory movement of said first lever into a reciprocal motion at said shutter, a hand lever, means pivotally supporting said hand lever on said material spreader, a link connecting said hand lever to said first lever, a turnable stop plate the axis of rotation of which is in the plane of rotation of said hand lever, said stop plate being positioned on said material spreader to limit rotation of said hand lever in that direction which causes said shutters to move to uncover said discharge ports, said stop plate having a plurality of flat detent surfaces lying on radii of different lengths, and each substantially perpendicular to its respective radius, and means for locking said stop member against turning.

2. In a material spreader, a hopper having at least one discharge port in the bottom thereof, at least one ported slidable shutter below and adjacent to said bottom, means on said hopper for supporting and guiding said shutter, a first lever pivotally connected to said hopper, means connecting said first lever to said shutter and adapted to translate oscillatory movement of said first lever into a reciprocal motion at said shutter, a second lever and means pivotally supporting said second lever on said material spreader, means interconnecting said levers, a turnable stop member the axis of rotation of which is in the plane of rotation of said second lever, said stop member being positioned on said material spreader to limit rotation of said second lever in that direction which causes said shutters to move to uncover said discharge ports, said stop member having a plurality of detent surfaces lying on radii of different lengths, and means for locking said stop member against turning.

3. The combination with a hopper having at least one discharge port therein, and a shutter plate movable relative to said port to adjust the flow area thereof, of a drawbar extending from said hopper and having a slot therein between the two ends thereof, a brace member extending from said hopper to said drawbar beyond said slot, a control lever pivotally secured to said brace member, one end of said control lever extending through said slot in said drawbar, linkage between said shutter plate and said one end of said control lever, a threaded pin extending above said drawbar adjacent that end of said slot toward which said one end of said control lever moves as said lever is moved to open said discharge ports, a plate turnable on said threaded pin and having a plurality of flat detent surfaces lying on radii of different lengths and each substantially perpendicular to its respective radius, and a fastener on said threaded pin for binding said plate against turning.

4. The combination with a hopper having at least one discharge port therein, and a shutter plate movable relative to said port to adjust the flow area thereof, of a drawbar extending from said hopper and having a slot therein between the two ends thereof, a brace member extending from said hopper to said drawbar, a control lever pivotally secured to said brace member, one end of said control lever extending through said slot in said drawbar, actuating linkage between said shutter plate and said control lever, a stop member and means rotatably mounting said stop member on said drawbar adjacent to that end of said slot toward which said one end of said control lever moves as said lever is moved to open said discharge ports, said stop member having a plurality of detent surfaces lying on radii of different lengths, and means for locking said stop member against turning.

5. In a material spreader including a hopper having at least one discharge opening therein, a shutter slidable to cover said discharge opening in varying degrees, and linkage for moving said shutter, means for controlling the movement of said shutter to open said discharge opening a predetermined amount, said other means comprising: a threaded pin and a stop plate turnable thereon, said stop plate being positioned to intercept and limit the movement of said linkage in that direction which causes said shutter to move to uncover said discharge opening, the periphery of said stop plate having a plurality of flat detent surfaces therein lying on radii of different length and each substantially perpendicular to its respective radius, and a fastener on said threaded pin to bind said stop plate against turning.

6. In a material spreader including a hopper having at least one discharge opening therein, a shutter movable to cover said discharge opening in varying degrees, and means for moving said shutter, other means for controlling the movement of said shutter to open said discharge opening a predetermined amount, said other means comprising: a turnable stop member the axis of rotation of which is in the plane of rotation of said lever, said stop member being positioned to limit the movement of said shutter moving means in that direction which causes said shutter to move to uncover said discharge opening, said stop member having a plurality of detent surfaces lying on radii of different lengths, and means for locking said stop member against turning.

7. In a material spreader including a hopper having at least one discharge opening therein, a shutter movable to cover said discharge opening in varying degrees, and means for moving said shutter, including a lever, other means for controlling the movement of said shutter to open said discharge opening a predetermined amount, said other means comprising: a movable stop member having a stepped edge portion, means adjustably positioning said stop member to place different sections of said stepped edge portion in the plane of movement of said lever, to adjustably limit the movement of said shutter moving means in that direction which causes said shutter to move to uncover said discharge ports, and releasable means for locking said stop member against movement.

8. In a material spreader including a control handle movable substantially in one plane for opening and closing a shutter, means for adjusting the extent to which said shutter can be opened, comprising: a turnable stop plate the axis of rotation of which is in said plane, said stop plate being so positioned on said material spreader that an edge portion of said plate intercepts and limits the movement of said control handle in that direction which causes said shutter to open, said stop plate having a plurality of graduated detent surfaces so arranged in said edge portion that rotation of said stop plate changes the extent to which said shutter may be opened, and means for locking said stop plate against turning.

9. In a material spreader including a movable control handle for opening and closing a shutter, means for adjusting the extent to which said shutter can be opened, comprising: a stop plate rotatable in a plane transverse to the plane of movement of the control handle, said stop plate having a plurality of graduated detent surfaces in an edge portion thereof, said plate movable to selectively position said detent surfaces to intercept and thereby limit the movement of said control handle, and means for locking said stop plate.

10. In a material spreader of the character described including a movable control handle for opening and closing a shutter: a stop member having a plurality of graduated detent surfaces formed in an edge portion thereof, said member movable in a plane transverse to the plane of movement of the control handle to a plurality of successive positions whereby at least one of said detent surfaces intercepts and limits the movement of said control handle, and means for locking said stop member.

11. In a material spreader a control handle movable substantially in one plane to reciprocate a part remote from the handle for the adjustment of the spreader and means for adjusting the extent of such reciprocation comprising an eccentrically mounted turnable stop plate the axis of rotation of which is in said plane, the body of the stop plate being so positioned that an edge portion of the plate intercepts and limits the movement of said control handle in that direction which causes reciprocation of the remote part in one sense, whereby rotation of the stop plate changes the extent of said reciprocation; and means for locking the stop plate against rotation.

EDMOND A. JUZWIAK.

REFERENCES CITED

The following references are of record in the file of this patent:

UNITED STATES PATENTS

| Number | Name | Date |
|---|---|---|
| 18,735 | Geiss et al. | Dec. 1, 1857 |
| 195,809 | Durbin | Oct. 2, 1877 |
| 331,600 | Zeigler et al. | Dec. 1, 1885 |
| 464,399 | Stewart | Dec. 1, 1891 |
| 493,146 | Bender | Mar. 7, 1893 |
| 554,262 | Grandstaff | Feb. 11, 1896 |
| 639,754 | Morgan | Dec. 26, 1899 |
| 736,300 | Sandifer et al. | Aug. 11, 1903 |
| 793,792 | Johnson | July 4, 1905 |
| 1,051,958 | Jones et al. | Feb. 4, 1913 |
| 1,289,618 | Billings | Dec. 31, 1918 |
| 1,516,954 | Cole | Nov. 25, 1924 |
| 1,574,437 | Martin | Feb. 23, 1926 |
| 1,778,622 | Bergsten | Oct. 14, 1930 |
| 1,840,602 | Pender | Jan. 12, 1932 |
| 2,046,603 | Baumgardner | July 7, 1936 |
| 2,245,152 | Masters | June 10, 1941 |
| 2,290,712 | Robinson | July 21, 1942 |
| 2,318,064 | Delaney | May 4, 1943 |
| 2,323,995 | Hiroshima | July 13, 1943 |
| 2,337,952 | Whitten | Dec. 28, 1943 |